United States Patent [19]
Martin

[11] Patent Number: 5,921,763
[45] Date of Patent: Jul. 13, 1999

[54] METHODS FOR DESTROYING COLLIERY METHANE AND SYSTEM FOR PRACTICING SAME

[75] Inventor: Richard J. Martin, San Jose, Calif.

[73] Assignee: Thermatrix, Inc., San Jose, Calif.

[21] Appl. No.: 08/641,636

[22] Filed: May 2, 1996

[51] Int. Cl.[6] .................................................. F23D 3/40
[52] U.S. Cl. .............................. 431/5; 431/7; 431/170; 431/202; 122/40
[58] Field of Search .................................. 431/5, 7, 170, 431/202; 122/4 D

[56] References Cited

U.S. PATENT DOCUMENTS

| | | |
|---|---|---|
| 3,928,961 | 12/1975 | Pfefefferle . |
| 4,116,005 | 9/1978 | Willyoung . |
| 4,252,070 | 2/1981 | Benedick .............................. 110/221 |
| 4,267,152 | 5/1981 | Benedick .............................. 422/183 |
| 4,688,495 | 8/1987 | Galloway .............................. 110/250 |
| 4,741,690 | 5/1988 | Heed ........................................ 431/7 |
| 4,823,711 | 4/1989 | Kroneberger et al. ................. 110/236 |
| 5,141,726 | 8/1992 | Breen et al. .......................... 423/239 |
| 5,147,201 | 9/1992 | Xiong ...................................... 431/7 |
| 5,163,384 | 11/1992 | Brannatrom . |
| 5,165,884 | 11/1992 | Martin et al. ............................ 431/7 |
| 5,188,804 | 2/1993 | Pace et al. ............................ 422/111 |
| 5,216,876 | 6/1993 | Gabrielson et al. .................... 60/737 |
| 5,320,518 | 6/1994 | Stilger et al. ............................ 431/7 |
| 5,335,630 | 8/1994 | Nilsson . |
| 5,388,395 | 2/1995 | Scharpf et al. . |

OTHER PUBLICATIONS

Miller, Byron, "Direct Coal Mine Ventilation with Coalbed Methane Fueled Gas Turbine Powerplants", submitted in partial fulfillment of the requirements for the degree of Master of Science at the Massachusetts Institute of Technology, Jun., 1982.

Primary Examiner—Carl D. Price
Attorney, Agent, or Firm—Woodcock Washburn Kurtz Mackiewicz & Norris LLP

[57] ABSTRACT

Improved methods for the destruction of methane gas within a colliery ventilation stream are provided that include the efficient utilization of the energy obtained from the oxidation of the methane gas. In practicing the methods, a colliery vent gas, containing a dilute concentration of methane in air, is oxidized within a matrix bed of heat resistant material to convert the methane to oxidation products with the simultaneous release of heat energy. The heat energy is recovered to thermally heat a working fluid used to operate a steam turbine to produce electricity.

13 Claims, 4 Drawing Sheets

METHODS FOR DESTROYING COLLIERY METHANE AND SYSTEM FOR PRACTICING SAME

FIELD OF THE INVENTION

The present invention relates to the use of a flameless oxidizer to efficiently destroy methane gas contained within a colliery vent stream. More particularly, the present invention utilizes the heat released from the destruction of the methane gas to provide thermal energy to a turbine fluid that is used to power a turbine to create electrical power.

BACKGROUND OF THE INVENTION

Methane emanates naturally from coal seams and the surrounding geological strata, and is a significant mine safety hazard. Various studies have been conducted to determine how to dispose of this methane gas and whether the methane can be advantageously utilized.

The methane present within the working areas of a coal mine is currently removed through the drawing of fresh air into the work areas by large ventilation systems. These systems function to dilute and withdraw the methane gas. The gases that emanate from coal beds generally do not contain such pollutants as carbon monoxide, sulfur oxides, and nitrogen oxides, but do contain small quantities, usually below 20% by volume, of heavier alkanes, e.g. ethane, propane, butane, and stable gases, e.g. carbon dioxide, oxygen and nitrogen.

The ventilated coal mine gases, referred to as colliery emission streams, have varying flow rates both with respect to time and with respect to different mines. However, the flow rate of these colliery emission streams generally ranges from between 300,000 and 600,000 standard cubic feet per minute (scfm). The concentration of methane in the stream varies between about 2,500 and 10,000 ppmv, which corresponds to a methane emission rate of about 750 to about 6,000 scfm per mine. In the United States alone, the total emission to the atmosphere of methane from coal mines has been estimated at 10 million scfh, which represents wasted thermal energy of over 9 billion btu/hr. Additionally, the large fans used to sweep air through the coal mine to provide ventilation also consume large quantities of electric power, often between 4,000 and 7,000 kW per mine.

In some cases, ventilation alone proves ineffective in controlling methane concentrations in the deepest and most intricate mines such that other means of removing methane become necessary. One method for dealing with this problem is to drill "drainage holes" into a coal seam prior to the actual mining operation. These drainage holes can yield significant quantities of relatively pure methane, sometimes up to 90 percent by volume while reducing the emission rate of methane in the ventilation air. The rate of drained methane removal is approximately the same as the rate of vented methane emission (1,000 to 5,000 scfm per mine). The drained methane has the potential to be sold as a commercial fuel gas.

The concentration of methane in the colliery emission stream is generally below 2 percent by volume, and more commonly below 1 percent by volume. Thus, conventional combustion systems are unable to take advantage of this relatively large, but dilute, source of energy. For direct combustion, a premixture of methane and air must be in the range of from about 5 to about 15 volume percent methane, the so-called flammable range. This level cannot be reached by combining the methane retrieved from the drainage holes with the colliery vent stream, which combined could lead to a concentration only as high as 2–3 percent by volume. To add sufficient commercial fuel to raise the concentration up to the flammable limit would be prohibitive.

Various other means of utilizing this large, but low concentration by volume of methane gas have been considered, but to date, none has been widely adopted. First, spark ignition engines are potentially able to convert the chemical energy in the methane/air mixture to useful energy, but this technology is not well suited for the task due to the inability of such engines to operate with mixtures below the lean limit thus necessitating large quantities of supplemental fuel. A second alternative is to use a gas turbine engine. However, these engines would also require a substantial quantity of supplemental fuel along with the energy required to compress the supplementary fuel to the operating combustion pressure. A final suggested design alternative is the use of regenerative thermal oxidizers; however, such systems have a relatively high pressure drop and generally operate on a reciprocal flow operation, which presents problems associated with the design of how to connect these units to the ventilation fan ducts.

A need therefore exists to design an alternative system to effectively destroy the methane present in colliery vent streams. A useful design should be able to efficiently convert the energy potential in the colliery vent streams to useful power.

SUMMARY OF THE INVENTION

The present invention provides methods for destroying the methane gas contained within a colliery ventilation stream with a concomitant recovery of energy from the destruction of the methane gas. The methods of the present invention provide a way in which the vast energy available from the oxidation of the dilute concentration of methane in the colliery ventilation stream can be efficiently utilized to generate significant amounts of electrical energy.

One embodiment of the methods of the present invention is practiced by directing the colliery vent gas, which comprises methane in an amount below about 3% by volume with the balance being primarily air, from the ventilation fan to the inlet of a flameless oxidizer. The colliery vent gas is then fed into a first portion of a matrix bed of heat resistant material that is contained with the flameless oxidizer and maintained at a temperature of at least about 1400° F. The methane within the colliery vent gas is thereby oxidized within an oxidation wave within the first portion of the matrix bed, and a gaseous product stream is created. The gaseous product stream is then passed through a heat exchanger while a turbine fluid, comprising $H_2O$, is simultaneously passed through the opposite side of the heat exchanger. The turbine fluid gains thermal energy upon passing through the heat exchanger by heat transfer from the gaseous product stream. The turbine fluid is then passed through a steam turbine to generate electrical power.

In a preferred embodiment of the present invention, the method is practiced by directing the colliery vent gas to and through a plenum adjacent to the inlet of the oxidizer and then through one or more feeding tubes, which have an inside portion, an entrance end, and an exit end, and where the feeding tubes extend through a gas impermeable barrier such that the entrance end of the feeding tubes is located within the plenum and the exit end of the feeding tubes is positioned either within the matrix bed or within a void located adjacent to the matrix bed within the oxidizer at a position remote from the gas impermeable barrier. The colliery vent gas passing through the feeding tubes and then through the matrix bed whereby the methane is oxidized within an oxidation wave within the matrix bed or in the void. The feeding tubes recuperatively pre-heat the colliery vent gas by means of the thermal energy produced from the oxidation of the methane.

The kinetic energy within the high velocity colliery vent stream exiting the ventilation fan can be advantageously utilized by sloping the side walls of the oxidizer inlet and/or the oxidizer itself. In such a design, the cross-sectional area of the inlet and/or the oxidizer increases in the direction leading away from the fan exhaust.

A heat exchange tube can also be located within the matrix bed of the flameless oxidizer for transferring thermal energy from the oxidation of the methane gas to the turbine fluid.

The present invention also provides for the systems used to practice the methods for destroying the methane gas within the colliery vent gas. The system includes a ventilation fan and the flameless oxidizer that has an inlet for receiving the colliery vent gas, an outlet for removing reaction gaseous products from the flameless oxidizer, and a gaseous oxidation section located between the inlet and the outlet comprising a matrix bed of heat resistant material. The system also includes a heat exchanger having a product gas inlet for receiving the reaction gaseous products from the outlet of the flameless oxidizer and a turbine fluid inlet for receiving a turbine fluid and a turbine fluid outlet through which the turbine fluid exits the heat exchanger. The system further includes a steam turbine that has a turbine inlet, in flow communication with the turbine fluid outlet of the heat exchanger, for receiving the turbine fluid.

DETAILED DESCRIPTION OF THE INVENTION

The present invention provides methods for the efficient destruction of methane gas present in a colliery emission stream with the concomitant recovery of energy from the methane gas. The recovered energy is advantageously utilized to thermally heat a working fluid that is used within a Rankine-style turbine to produce electrical energy.

A colliery vent, or emission, stream is created by passing large quantities of sweep air through a coal mine. The sweep air is used to remove methane gas from the coal mine. The colliery emission stream is thus chiefly constituted by air, with a very dilute concentration of methane gas. The methane gas can be present in an amount as high as about 2–3% by volume, but is commonly present in an amount of from about 0.25 to about 1.5% by volume. The other gases present in colliery emission streams include lower alkanes such as ethane, propane, and butane along with carbon dioxide, nitrogen, and oxygen in a total amount of up to about 0.1% by volume. The air constitutes at least about 97%, and more commonly at least about 98%, by volume of the colliery vent stream.

The flow rates of the colliery emissions vary among different mines. Generally, the volume of these emissions is between about 300,000 and about 600,000 standard $ft^3$/min. (scfm). The methane emission rate within the colliery vent stream is generally between about 500 and about 7500 scfm. It is this methane gas that is used in the systems of the present invention to provide energy for the generation of electrical power.

Figure 1:
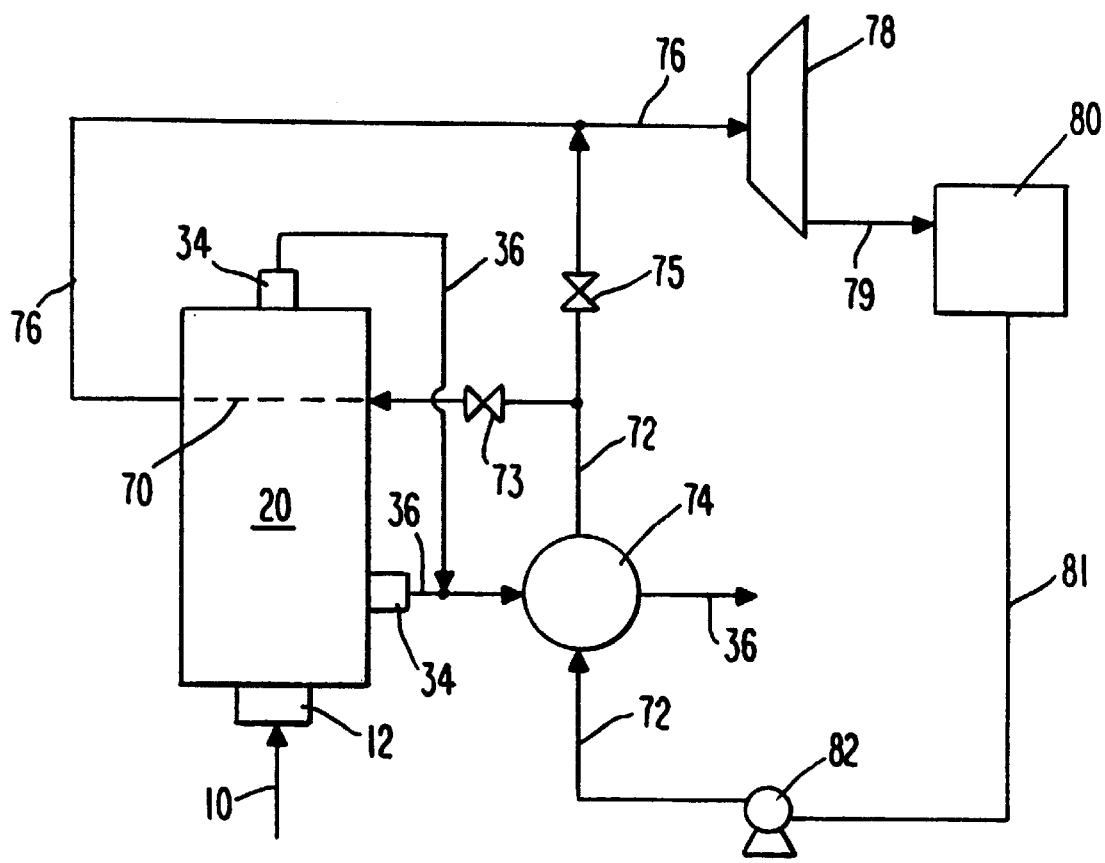
FIG. 1 is a schematic diagram of an embodiment of a system of the present invention.

The general aspects of the present invention are more easily understood by reference to FIG. 1. A colliery vent stream 10 is directed into a flameless oxidizer 20 via inlet 12. The methane gas within the colliery vent stream 10 is thermally oxidized within a matrix bed of porous inert media (PIM) within the flameless oxidizer 20.

Significant research into the phenomena of oxidation within PIM has recently been undertaken. Because PIM oxidation can occur outside the normal premixed fuel/air flammability limits, the technology can be called "flameless." In this regard U.S. Pat. Nos. 4,688,495 (Galloway) and 4,823,711 (Kroneberger et al.) disclose early work on matrix oxidation technology. In addition, U.S. Pat. Nos. 5,165,884 (Martin et al.) and 5,320,518 (Stilger et al.), discuss in significant detail the technology involved in the designing of a flameless oxidizer 20. The issued Martin et al., Stilger et al., Galloway, and Kroneberger et al. patents are hereby incorporated in their entireties by reference.

Figure 2:
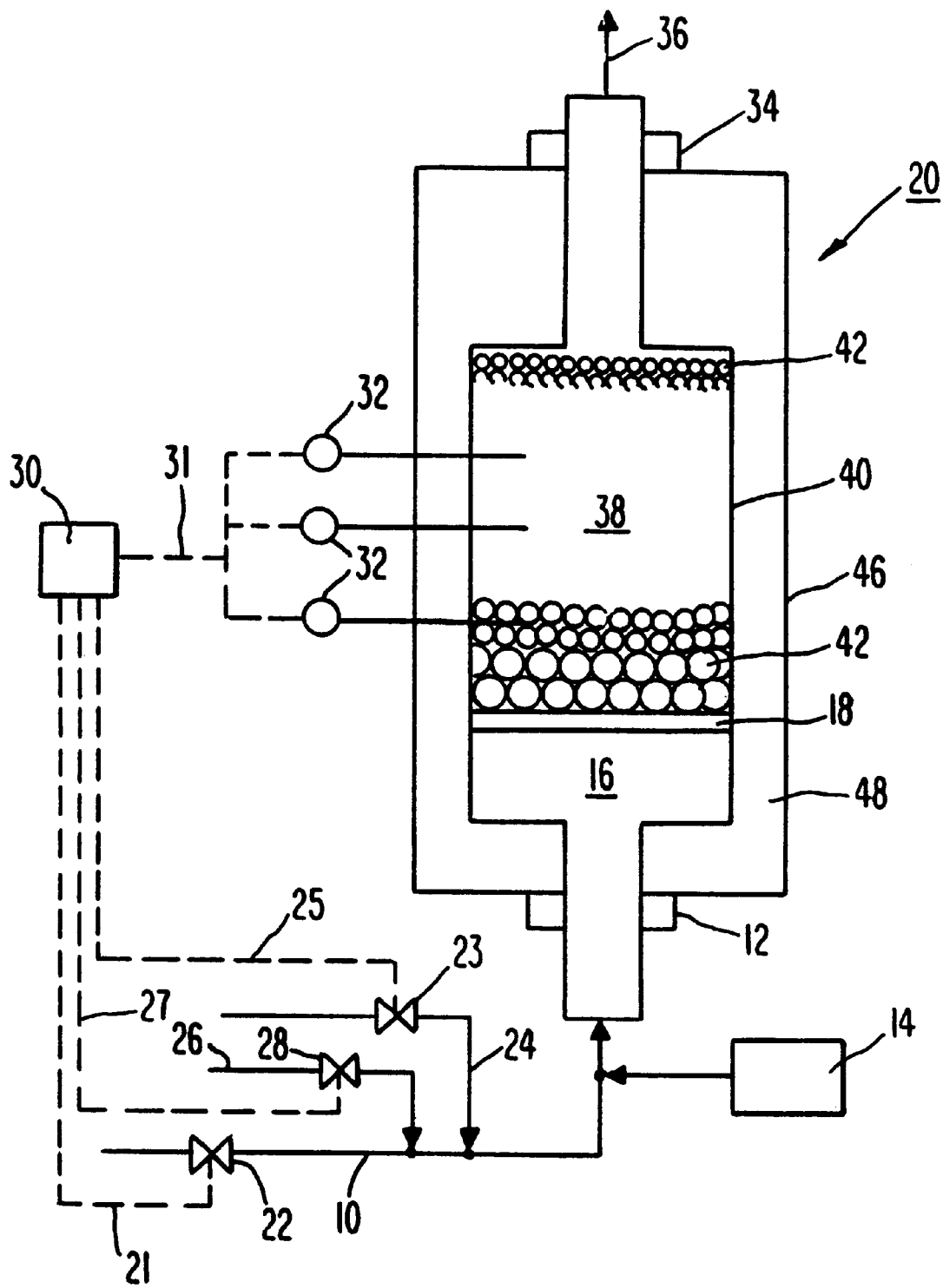
FIG. 2 is a cross-sectional, side-view schematic of an embodiment of the flameless oxidizer of the present invention.

An embodiment of a flameless oxidizer 20 is shown in FIG. 2. The entire thermal oxidation assembly will be mounted in an outer containment shell 46, preferably made of carbon steel or other alloy. This outer containment shell 46 is preferably lined with heat resistant, refractory insulation 48. The insulation 48 defines a wall 40 for the containment of the matrix bed 38, and is made from such materials as firebrick, castable refractory, insulating fiber modules, or a heat-resistant alloy.

In a typical process, the flameless oxidizer 20 is operated by initially bringing the matrix bed to a temperature to support thermal destruction of the colliery vent stream. In one embodiment, a preheater 14 is used, fired for example with natural gas, to heat the plenum 16, if present, and the matrix bed 38 in order to raise the bed temperatures above the autoignition point of the colliery vent stream. The pre-heater can be any device that will raise the temperature of the bed directly, or any device to pre-heat gases that can then be channeled into the bed to pre-heat the bed itself. Pre-heating devices include: gas burners, electric heaters mounted exterior to or interior of, the matrix, inductive heaters, radiant tube heaters, etc. If the matrix is metallic, a resistive heater may be used. Once the initial operation temperature has been achieved within the oxidizer 20, preheating is ceased.

In one embodiment, ambient air is then forced with pressure into the plenum 16, if used, and into the matrix bed 38 until the plenum 16 is cooled to a temperature below the autoignition of the colliery vent stream. By introducing ambient air through the plenum 16, the plenum 16 cools quickly, while the temperature of the matrix bed 38 remains largely above the autoignition temperature, although the matrix bed 38 immediately adjacent to the plenum 16 will be cooled below the autoignition temperature.

The colliery vent stream 10 is then introduced into the plenum 16, if used, and the matrix bed 38. A perforated plenum plate 18 can be used to separate the plenum 16 from the matrix bed 38. Upon entering the flameless oxidizer 20, the colliery vent stream 10 will be raised to oxidation temperatures of 1400–3500° F. (760–1925° C.), and preferably 1550–1800° F. (845–980° C.), by the stored heat in the matrix bed 38. The gaseous stream is then maintained at these temperatures for a sufficient residence time to ensure substantially complete destruction of the methane gas to stable products, such as $CO_2$ and $H_2O$, within an established oxidation wave. The destruction efficiency of the flameless oxidizer 20 is at least 99%, preferably at least 99.9%, and more preferably at least 99.99%, by weight of the methane gas. The oxidation wave is observed as a steep increase in bed temperature from the temperature of the colliery vent stream 10 on the inlet side of the wave to approximately the adiabatic oxidation temperature of the mixture on the outlet side of the wave. This rapid change takes place over a relatively short distance in a typical oxidizer, with the actual distance being dependent upon feed concentrations, feed rates, gas velocity distribution, bed material, and bed physical properties, type of specific feed materials, etc. Heat losses in the direction of flow also will have an effect on the length of the oxidation wave.

The plenum 16 will act to evenly distribute the gases entering the oxidizer 20 and further mix these gases prior to entering the matrix bed 38. It is believed that this helps to achieve a relatively flat cross-sectional profile of the oxidation wave perpendicular to the direction of the flow of the gases through the matrix bed 38. In some instances the plenum 16 may be desirable to achieve the flatness of the cross-section of the wave, depending on the configuration of the matrix bed 38.

The position and stability of the oxidation wave within the flameless oxidizer 20 can be controlled by means of a process controller 30. Prior to entering the flameless oxidizer 20, supplemental air can be injected into the colliery emission stream 10 via line 24 or supplemental fuel, such as natural gas or propane, can be injected into the gaseous stream via line 26. The rates of addition of the supplemental air and/or fuel can be regulated through use of a process controller 30 that is electronically wired to a control valve 23 on the air line 24 and to a control valve 28 on the fuel line 26, via lines 25 and 27, respectively. The supplemental fuel and/or air are used to maintain an oxidation wave within the flameless oxidizer 20. The process controller 30 can also control the flow rate of the colliery emission stream 10 via valve 22, which is electronically wired to the controller 30 by line 21. The process controller 30 is preferably also used to monitor the temperature within a plurality of locations within the matrix bed 38. As shown in FIG. 2, the thermocouples 32 are situated to monitor the temperature within the matrix bed 38 and their output is electronically related to the process controller 30 via lines 31. In such a way, the temperatures within the matrix bed 38 can be utilized to control the flow of the supplemental air 24 and/or fuel 26 and the colliery vent stream 10.

After thorough destruction of the methane within the flameless oxidizer 20, the resulting gaseous products will exit the flameless oxidizer through oxidizer outlet 34 via line 36.

The embodiment shown in FIG. 2 is advantageous since the product gases flowing out of the oxidizer 20 through line 36 are at a temperatures in the range of above about 1400° F. These gases can be used to heat a working fluid that can then be used to drive a steam turbine to produce electrical energy. However, the oxidizer 20 as described in FIG. 2 generally requires at least about 3.5–4% by volume of methane to sustain an oxidation wave. Consequently, supplemental fuel would probably be required to operation in this mode. This configuration would be preferred in those instances where a significant portion of the methane in the colliery vent stream is from a drained methane source and thus the methane volume content is significantly higher.

Figure 3:
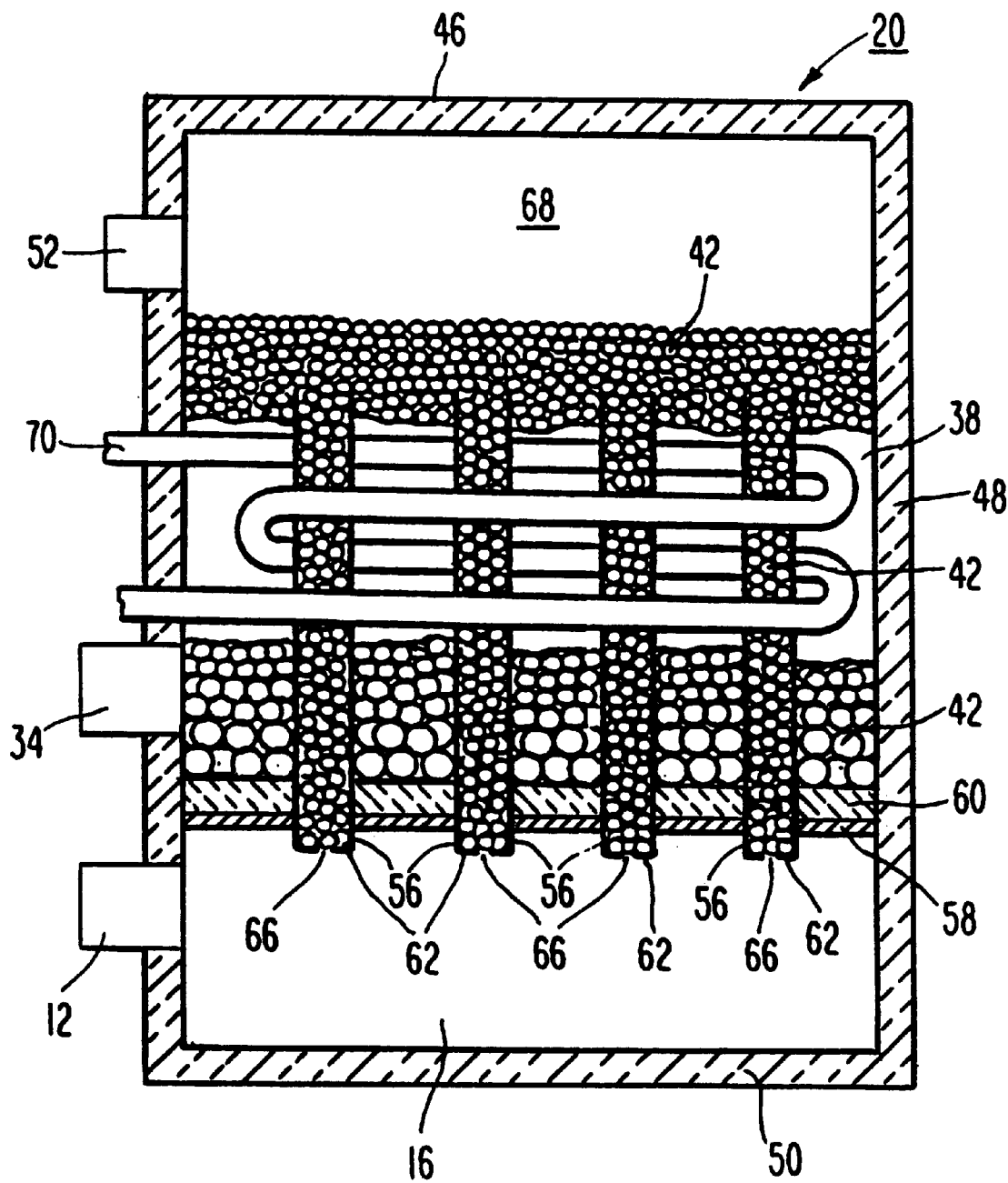
FIG. 3 is a cross-sectional, side-view schematic of an embodiment of the flameless oxidizer of the present invention.

A preferred embodiment is shown in FIG. 3 where the oxidizer 20 employs a heat recuperation concept to preheat the incoming colliery vent stream 10. Such a design can sustain an oxidation wave at methane concentrations as low as about 0.8 to about 1.2% by volume. Thus, the need for supplemental fuel is quite minimal for most colliery vent streams. However, the exiting product gases in line 36 are generally at about 600–800° F., and, although they can still be advantageously used to heat a working fluid for use with a steam turbine, they do not provide as much heat energy as those gases exiting the oxidizer design shown in FIG. 2.

FIG. 3 shows the preferred embodiment of the present invention. Outer containment shell 46 and the insulation 48 are made of the same materials as described with respect to FIG. 2. The inner surface of the steel may be protected by an appropriate corrosion-resistant material, such as an elastomer or a tar-like coating. A dense castable refractory material also may seal the bottom of the processor 50.

The oxidizer 20 has an inlet port 12, an outlet port 34, and a heating port 52. The inlet port 12 leads to an inlet plenum 16 at the bottom of the oxidizer 20. A number of feed tubes 56 extend through an impermeable, rigid tubesheet 58 preferably made of steel or metal alloy, and a heat resistant ceramic insulating barrier 60 at the roof of the plenum 16. The tubesheet 58 provides mechanical support for the tubes 56. The lower ends of the feedtubes 56 are provided with caps 62 to retain matrix materials 42 inside the tubes 56. The caps 62 are provided with orifices 66 to permit the flow of gases from the inlet plenum 16 to the tubes 56. The lowermost two or three layers of matrix packing 42 inside the tubes 56 are preferably larger than the remaining matrix layers above, to diminish the possibility that small matrix materials could occlude the orifices 66. In addition, the size and shape of the matrix materials 42 within the tubes 56 may differ from that of the matrix materials 42 in the surrounding matrix bed 38 in order to compensate for certain process conditions, such as comparative pressure drops. The upper ends of the feed tubes 56 may be secured to each other and the outer containment shell 46 to provide extra mechanical strength, although this was not found to be necessary in the preferred embodiment.

In a preferred embodiment, the diameters of the feed tubes 56 are in the range of 0.25 to 30 inches (0.64 to 76.2 cm), more preferably in the range of 0.75 to 12 inches (1.9 to 30.5 cm), and most preferably 1.5 to 6 inches (3.8 to 15.2 cm). They are preferably installed in a regularly-spaced manner with the spacing-to-diameter ratio preferably 1 to 10, more preferably 1.5 to 5, and most preferably 2 to 4. The length of the tubes 56 is preferably 1 to 100 times the diameter of the interior of the tubes 56 themselves, more preferably 1 to 50 times the diameter of the interior of the tubes 56, and most preferably 1 to 10 times the diameter of the interior of the tubes 56. The tubes 56 are preferably welded or press-rolled to the tubesheet 58. The thermal conductivity of the tube material is preferably greater than 10 W/m-K, and most preferably greater than 30 W/m-K. In addition to enhancing the heat transfer properties, the preferred tube sizes and spacings also provide for better tube mechanical integrity and less costly welding and attachment operations than typical for a conventional heat exchanger.

The barrier 60) supports the matrix bed 38 of heat-resistant packing material 42. The matrix material 42 may be comprised of ceramic balls or ceramic foam of varying shapes and sizes as discussed above with respect to FIG. 2. The heat-resistant packing material of the matrix bed 38 fills the region between the barrier 60 and the void 68 at the top of the oxidizer 20 including the interior of the feed tubes 56. The outlet port 34 has heat-resistant screens (not shown) to retain the matrix material 42 inside the processor. An outlet plenum, where pressure drop per unit distance traversed by the gas are lower than in the matrix, may be used to enhance the uniformity of distribution of the gases through the matrix. Preferred plenum materials include rigid grids of ceramic or metal alloy, and horizontally- or diagonally-layered packings of increasing or decreasing size.

The matrix bed 38 may be heated by forcing heated gases such as air in through the heating port 52 in a similar manner to that described with respect to the oxidizer 20 of FIG. 2, and extracting this heating gas, that now has a lower temperature, through the outlet port 34. Alternatively, the matrix bed 38 may be heated by electric heaters or other means. During preheating, a low flow of ambient air may be bled through the inlet port 12 and up through the heat exchanger/feeding tubes 56 to ensure the tube material is not overheated.

Once the matrix bed 38 has been heated to a temperature sufficient to oxidize the methane gas within the colliery vent stream, the preheating is terminated, and then the colliery vent stream 10 is introduced to the oxidizer 20 through the inlet port 12. The apparatus of the present invention can also include the process controller 30 as shown in FIG. 2 to control the flow rates of the colliery vent stream 10, and the flow rates of any supplemental air/fuel such as shown in FIG. 2. The colliery vent stream may also be heated prior to introduction to oxidizer 20 by applying external heat to the gases prior to entering the oxidizer 20 with, for example, an external heat exchanger. Exhaust gases are extracted from the oxidizer 20 through the exhaust port 34.

It is desirable to maintain a well-stirred reaction zone at the upper end of the feed tubes 56. This may be accomplished by measuring the temperature of the matrix bed 38 in this region and controlling reaction matrix parameters in accordance with the temperature information. For instance, if the temperature declines, supplemental fuel can be added, or supplemental air can be reduced to prevent migration of the oxidation zone down along the outside of the tubes 56. If the temperature increases, supplemental fuel can be reduced or supplemental air can be added to prevent the oxidation zone from migrating down the inside of the tubes 56. This monitoring of the temperatures within the matrix bed 38 and the adjacent void 68 can be accomplished by thermocouples whose output can be connected to the process controller 30. The process controller 30 can then be used to stabilize the oxidation wave within the matrix bed 38 and/or void 68 through the adjustment of the flow rates of the colliery vent stream and/or supplemental air/fuel.

Typically, during operation, the well-stirred oxidation wave will be maintained in a stable configuration in the region near the ends of the feed tubes 56. As the exhaust gases flow down past the feed tubes 56 they heat the feed tubes 56 and the matrix material 42 by forced convection. Although radiant heating also contributes to heat transfer from the exhaust gases to the matrix bed 38 and the feed tubes 56, this contribution is generally small compared to the convective heat transfer.

The oxidation region near the top of the oxidizer 20 has the highest temperature, generally about 1900° F. (1040° C.). The temperature decreases as the gases travel towards the outlet port 34, to reach a value of about 500° F. (260° C.) near the bottom of the matrix bed 38. The heat of the matrix materials 42 is radiantly transferred to the feed tubes 56. The temperature profile of the feed tubes 56 is approximately equal to the temperature profile of the matrix bed 38, i.e., the radiant coupling between the matrix bed 38 and the tubes 56 can be considered to be predominantly in directions orthogonal to the longitudinal axes of the tubes 56.

FIG. 3 further shows an optional configuration of the oxidizer 20 that may be utilized according to the present invention to heat a turbine fluid. A tube 70 enters and exits the oxidizer through the outer containment shell 46. In alternative embodiments, the tube 70 may enter and/or exit the oxidizer 20 from the top or through the barrier 60, the tube 70 may exit the oxidizer 20 on a different side than the side from which it enters. The tube 70 can be designed to make an anfractuous path through the matrix bed 38 since the amount of heat transfer to the tube 70 increases with the length of the path through the matrix bed 38.

The hot exhaust gases from the exothermic reaction of the methane gases within the colliery vent stream pass down through the matrix bed 38 past the feed tubes 56 and the tube 70 and exit through the outlet port 34. As discussed above, the dominant mechanism for heat transfer from the hot exhaust gases to the feed tubes 56 and the tube 70 is convective heat transfer to the matrix bed 38 and radiative heat transfer from the matrix bed 38 to the tube 70 and the feed tubes 56. The tube 70 may contain matrix materials 42 in the interior to promote heat transfer.

After the methane gas has been oxidized within the flameless oxidizer 20, the gaseous products, including $CO_2$ and $H_2O$, exit through the outlet 34 via line 36 as shown in FIG. 1. The oxidizer 20 in FIG. 1 shows two possible outlets 34 with accompanying lines 36 for the two primary designs described in FIGS. 2 and 3. The oxidizer 20 can be employed to transfer thermal energy to a turbine fluid used to generate electrical power.

Figure 4:
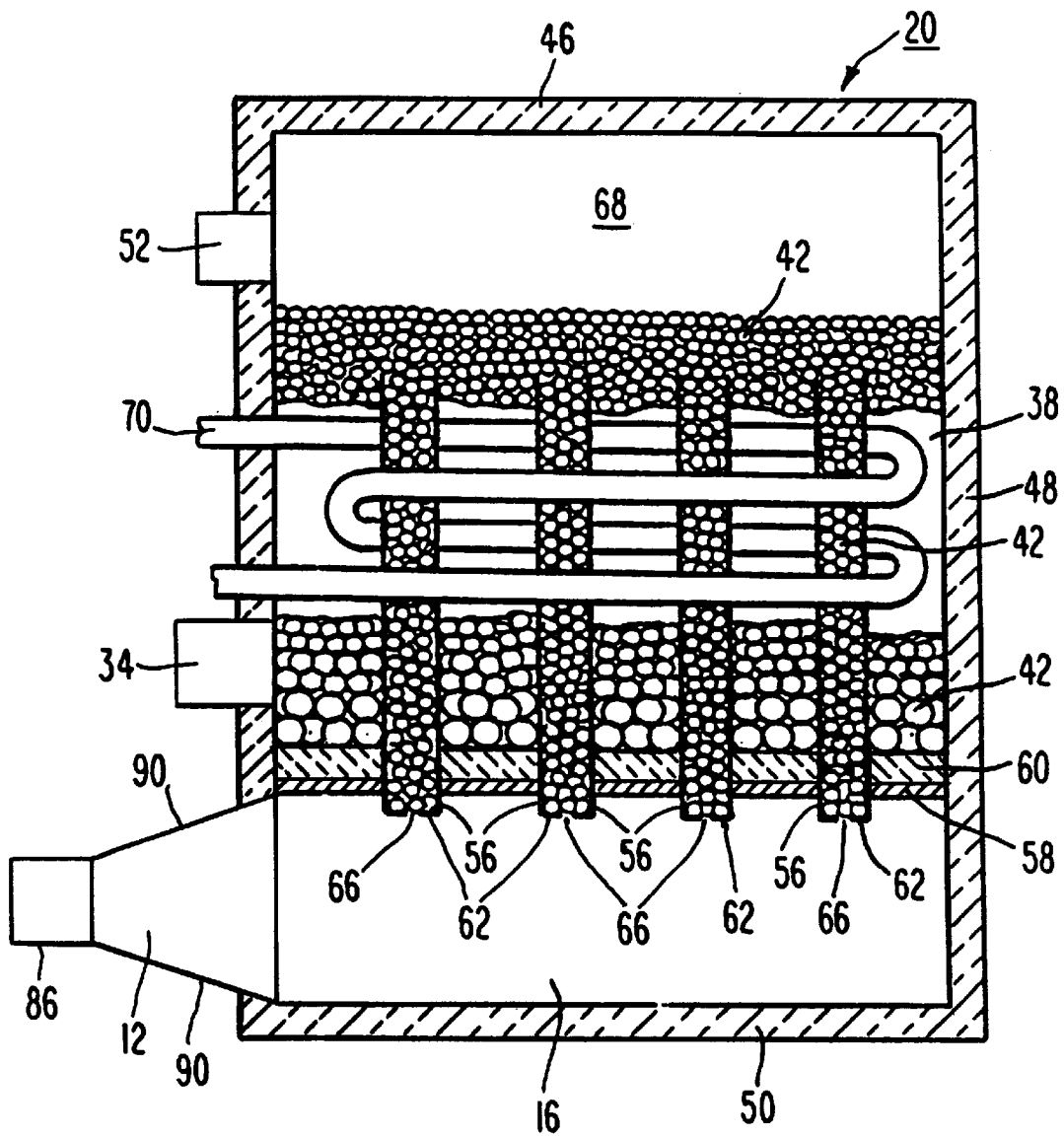
FIG. 4 is a cross-sectional, side-view schematic of an embodiment of the flameless oxidizer of the present invention having sloped oxidizer inlet walls.

It is preferred that the connection between the ventilation fans through which the colliery vent stream flows be closely coupled to the plenum of the flameless oxidizer. In such a way, a significant energy recovery may result by converting the kinetic energy of the fan exhaust into internal energy in the form of pressure. As shown in FIG. 4, one way to recover some of this energy is to closely couple the ventilation fan 86 to the plenum 16 of the oxidizer 20. The ventilation fan 86 is shown as being directly coupled to the inlet port 12 of the oxidizer 20. The inlet port 12 has sloping side walls 90 that are designed to reduce the velocity of the colliery vent stream in as uniform and reversible manner as possible. The sloping side walls 90 define an inlet port 12 that has an increasing cross-sectional area in the direction of the flow of the colliery vent stream.

Figure 5:
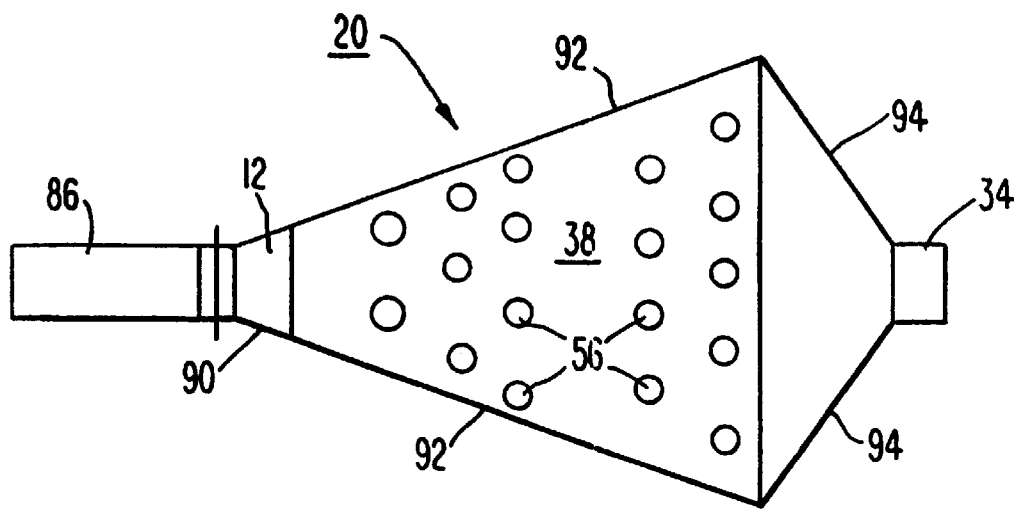
FIG. 5 is a cross-sectional, top-view schematic of an embodiment of the flameless oxidizer of the present invention having sloped oxidizer inlet and plenum walls.

In an alternative embodiment, shown in FIG. 5, which is a top view of an oxidizer 20 such as the one shown in FIG. 3, the side walls 92 of the oxidizer 20 are also sloped along with the side walls 90 of the inlet port 20 for the same purpose. The degree of sloping for the side walls 92 is optimized to avoid flow separation and other irreversibilities. The sloping side walls 92 define an oxidizer 20 that has a cross-sectional area that increases for at least a portion of the distance from the inlet 12 of the oxidizer 20 to the outlet 34 of the oxidizer 20. The oxidizer 20 may also be designed to have sloping exit walls 94 leading to the outlet 34. As used in FIG. 5, the colliery ventilation stream enters the oxidizer 20 by means of fan 86 and through the inlet port 12. This gas stream is then directed through the feeding tubes 56 which are situated within the matrix bed 38 of matrix materials 42 (not shown). The product gases then exit the oxidizer 20 through the outlet port 34.

As shown in FIG. 1, the oxidizer 20 can be used in the first instance to transfer thermal energy from the hot gaseous products within line 36 to a turbine fluid within line 72. This transfer can take place within a heat exchanger 74. The heated turbine fluid within line 72 can then be directed through valve 75 and then through line 76 to a steam turbine 78. The oxidizer 20 can also be used to transfer thermal energy from the hot gaseous products generated within the matrix bed 38 by means of the tube 70 within the oxidizer 20. As shown in FIG. 1, the turbine fluid within line 72 can be directed through valve 73 to flow through tube 70 whereby the turbine fluid would gain thermal energy from the matrix bed 38. The turbine fluid then exits the tube 70 via line 76 and is directed towards the turbine 78.

The steam turbine 78 uses the turbine fluid, typically water in the form of steam, to generate electrical power. The steam exits the steam turbine 78 through line 79 and is condensed in condenser 80. The condensed turbine fluid is then pumped through line 81 by pump 82 into line 72 to continue its cycle through the system.

Although the present invention has been described above with respect to particular preferred embodiments, it will be apparent to those skilled in the art that numerous modifications and variations can be made to those designs. The descriptions provided are for illustrative purposes and are not intended to limit the invention.

The recovery of energy from the colliery vent stream, through the oxidation of the methane found therein, can result in a substantial production of electricity through, by example, the operation of a steam turbine working off of a turbine fluid that is heated by the energy converted from that methane. The steam turbine has been used in the description of the present invention as a unit operation for using the working fluid to generate electrical energy. Other unit operations, such as non-internal combustion engines, could also be used to generate electricity. The utility of the present invention for recovering the large amounts of energy from the dilute methane found in the colliery ventilation stream is shown by the following example.

A typical colliery ventilation stream can consist of 500,000 scfm of air with 0.8% by vol. methane. To this, an additional 1750 scfm of drained methane, assumed to be 100% pure for purposes of this calculation, would be added for a combined heat release from the methane of about 94 $MW_{th}$ in the flameless thermal oxidizer. The temperature of the gaseous products leaving the oxidizer, assuming a design such as shown in FIG. 3., would be about 630° F., and would contain less than about 1 ppmv of methane. The oxidizer exhaust flow, about 502,000 scfm, would be directed across a heat recovery boiler, where approximately 48 $MW_{th}$ of heat could be recovered in the form of about 143,000 lb/hr of steam at approximately 350 psig and 500° F., which is about 25° F. above the saturation temperature. By expanding this steam across a Rankine-style turbine with an isentropic efficiency of 81%, about 11 $MW_e$ of shaft power can be generated, assuming condenser conditions of about 145° F. and 3.2 psia on the steam side. A small fraction, less than 15%, of this power would be lost to feed and auxiliary pumps and to mechanical inefficiencies in the electricity generator. However, the recovered energy represents a significant cost savings or possible revenue source to the mining operation.

Although the present invention has been described above with respect to particular preferred embodiments, it will be apparent to those skilled in the art that numerous modifications and variations can be made to those designs. For instance, the heat exchanger 74 can alternatively be located on the exit side of the tube 70 traversing the matrix bed 38 of the oxidizer 20. The descriptions provided are for illustrative purposes and are not intended to limit the invention.

What is claimed is:

1. A method for destroying methane within a colliery ventilation stream with a concomitant recovery of energy, comprising:
   (a) directing with a ventilation fan a colliery vent gas comprising methane in an amount below about 3% by volume and air to an inlet of a plenum of a flameless oxidizer, wherein the ventilation fan is closely coupled to the plenum inlet, and the plenum is located upstream of a matrix bed of inert heat resistant material and has sloping sidewalls such that the cross sectional area of the plenum increases in the direction leading away from the plenum inlet;
   (b) feeding said colliery vent gas into a first portion of the matrix bed of inert heat resistant material contained within said flameless oxidizer, said first portion of said matrix bed being maintained at a temperature of at least 1400° F.,
   whereby the methane in said colliery vent gas is oxidized within an oxidation wave into a gaseous product stream comprising carbon dioxide;
   (c) passing said gaseous product stream through a heat exchanger and simultaneously passing a turbine fluid comprising $H_2O$ through said heat exchanger, whereby the turbine fluid gains thermal energy upon passing through the heat exchanger by heat transfer from said gaseous product stream; and
   (d) passing said turbine fluid through a steam turbine to generate electrical power.

2. The method of claim 1 wherein the flameless oxidizer has side walls that contain the matrix bed of heat resistant material, and wherein the side walls are sloped such that the flameless oxidizer has an increasing cross-sectional area in the direction moving away from the inlet of the flameless oxidizer.

3. The method of claim 1 further comprising the steps of:
   (i) providing at least one heat exchanger tube that passes through the oxidizer and through a portion of the matrix bed;
   (ii) circulating said turbine fluid through said heat exchanger tube, whereby said turbine fluid gains thermal energy upon passing through the heat exchanger tube by heat transfer from the matrix bed.

4. The method of claim 3 whereby said turbine fluid is circulated through said heat exchanger tube subsequent to the passing of said turbine fluid through the heat exchanger.

5. The method of claim 3 wherein the flameless oxidizer has side walls that contain the matrix bed of heat resistant material, and wherein the side walls are sloped such that the flameless oxidizer has an increasing cross-sectional area in the direction moving away from the inlet of the flameless oxidizer.

6. The method of claim 1 further comprising the step of directing drained methane into the flameless thermal oxidizer as supplemental fuel.

7. A method for destroying methane within a colliery ventilation stream with a concomitant recovery of energy, comprising:
   (a) directing with a ventilation fan a colliery vent gas comprising methane in an amount below about 3% by volume and air to an inlet of a plenum of a flameless oxidizer having a matrix bed of inert heat resistant material wherein the ventilation fan is closely coupled to the plenum inlet, and;

(b) feeding the colliery vent gas through the plenum within said oxidizer, wherein the plenum is located upstream to the matrix bed and has sloping sidewalls such that the cross sectional area of the plenum increases in the direction leading away from the plenum inlet;

(c) directing the colliery vent gas from the plenum through one or more feeding tubes, each of the feeding tubes having an inside portion, an entrance end, and an exit end, the one or more feeding tubes extending through a gas impermeable barrier such that the entrance end of the feeding tubes is located within the plenum and the exit end of the feeding tubes is positioned either within the matrix bed or within a void located adjacent to the matrix bed within the oxidizer at a position remote from the gas impermeable barrier;

(d) directing the colliery vent gas from the exit end of the one or more feeding tubes through the matrix bed and to an oxidizer outlet, whereby the colliery vent gas is oxidized in the matrix bed or in the void within an oxidation wave to produce a gaseous product stream, and whereby the colliery vent gas is recuperatively pre-heated in the one or more feeding tubes by the thermal energy produced during the oxidation process in the matrix bed;

(e) passing said gaseous product stream through a heat exchanger and simultaneously passing a turbine fluid comprising $H_2O$ through said heat exchanger, whereby the temperature of the turbine fluid is increased within said heat exchanger; and (f) passing said turbine fluid through a steam turbine to generate electrical power.

8. The method of claim 7 further comprising the steps of:

(i) providing at least one heat exchanger tube that passes through the oxidizer and through a portion of the matrix bed;

(ii) circulating said turbine fluid through said heat exchanger tube, whereby said turbine fluid gains thermal energy upon passing through the heat exchanger tube by heat transfer from the matrix bed.

9. The method of claim 8 whereby said turbine fluid is circulated through said heat exchanger tube subsequent to the passing of said turbine fluid through said heat exchanger.

10. A system for destroying methane within a colliery ventilation stream with a concomitant recovery of energy, comprising:

(a) a ventilation fan that exhausts a colliery vent gas comprising methane in an amount of less than about 3% by volume and air;

(b) a flameless oxidizer having a plenum inlet for receiving the colliery vent gas that is closely coupled to the ventilation fan, a plenum having sloping sidewalls such that the cross sectional area of the plenum increases in the direction leading away from the plenum inlet, an outlet for removing reaction gaseous products from the flameless oxidizer, and a gaseous oxidation section located between the plenum inlet and the outlet comprising a matrix bed of inert heat resistant material;

(c) a heat exchanger having a product gas inlet for receiving the reaction gaseous products from the outlet of the flameless oxidizer and a turbine fluid inlet for receiving a turbine fluid comprising water and a turbine fluid outlet through which the turbine fluid exits the heat exchanger; and (d) a steam turbine that has a turbine inlet, in flow communication with the turbine fluid outlet of the heat exchanger, for receiving the turbine fluid.

11. The system of claim 10 further comprising a heat exchange tube having an inlet and an outlet, the heat exchange tube traversing a path through the matrix bed of heat resistant material in the flameless oxidizer and wherein the turbine inlet is in flow communication with the outlet of the heat exchange tube.

12. The system of claim 10 wherein the flameless oxidizer further comprises:

(i) a gas impermeable barrier separating the matrix bed from the plenum; and (ii) one or more feeding tubes, each of the feeding tubes having an inside portion, an entrance end, and an exit end, the one or more feeding tubes extending through the gas impermeable barrier such that the entrance end of the feeding tubes is located within the plenum and the exit end of the feeding tubes is positioned either within the matrix bed or within a void located adjacent to the matrix bed within the oxidizer at a position remote from the gas impermeable barrier.

13. The system of claim 10 wherein the system excludes a gas turbine.

* * * * *